A. SCHEIBLER.
INTERNAL COMBUSTION ENGINE.
APPLICATION FILED OCT. 29, 1917. RENEWED FEB. 2, 1921.
1,372,559. Patented Mar. 22, 1921.
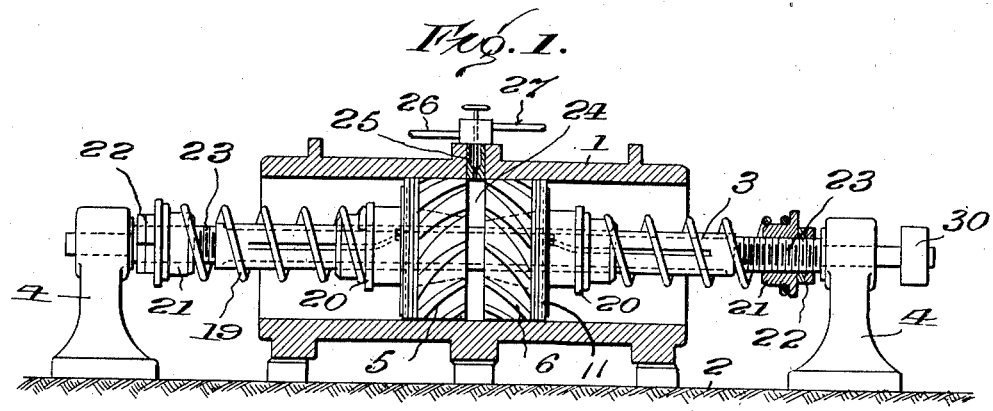
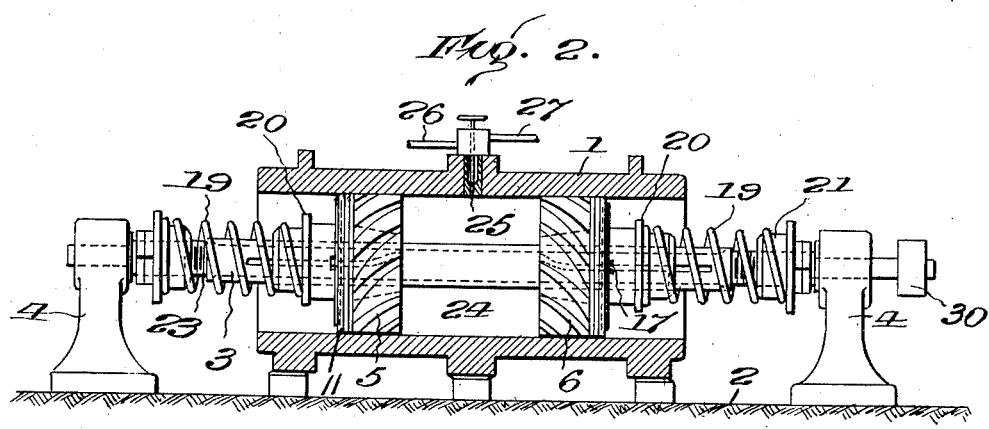
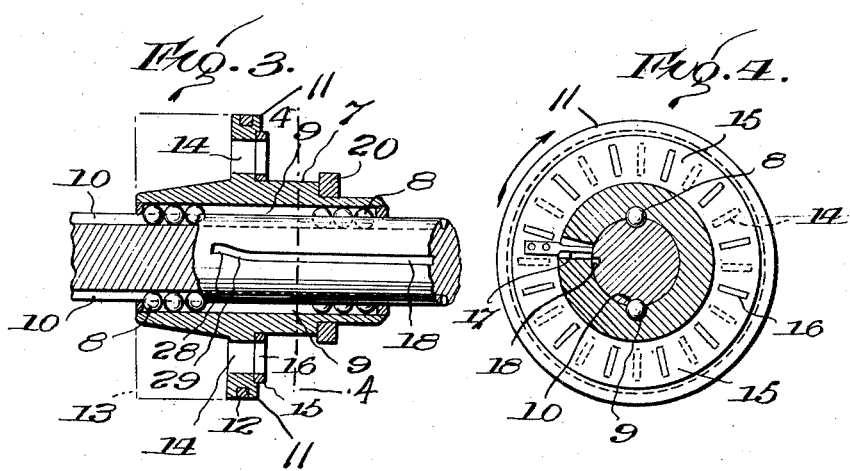
Inventor
August Scheibler
By
Attorney

UNITED STATES PATENT OFFICE.

AUGUST SCHEIBLER, OF ALTSTETTEN, ZURICH, SWITZERLAND, ASSIGNOR, BY DIRECT AND MESNE ASSIGNMENTS, OF THREE-FOURTHS TO FRANK H. STIASNY, OF NEW YORK, N. Y., AND ONE-FOURTH TO EDWARD R. HOFFMAN, OF ALBANY, NEW YORK.

INTERNAL-COMBUSTION ENGINE.

1,372,559.  Specification of Letters Patent.  Patented Mar. 22, 1921.

Application filed October 29, 1917, Serial No. 199,185. Renewed February 2, 1921. Serial No. 441,994.

*To all whom it may concern:*

Be it known that I, AUGUST SCHEIBLER, a citizen of the Confederation of Switzerland, residing at Altstetten, b/Zurich, Switzerland, have invented certain new and useful Improvements in Internal-Combustion Engines, of which the following is a specification, reference being had therein to the accompanying drawing.

My invention relates to internal combustion engines and especially to those of the turbine type.

The general objects of my invention are to increase the efficiency, reduce the weigth per unit power, and at the same time simplify the structure of engines of this type.

I attain my object through the use of a sliding rotor or rotors arranged to form a portion of the walls of the combustion chamber producing in effect an expansible combustion chamber into which chamber the fuel is introduced under pressure and ignited preferably by compression. Compression is produced by an axial sliding movement of the rotor to contract the combustion chamber, means being provided for closing the vanes of the rotor during compression. Power is taken from the engine by means of a shaft on which the rotor or rotors are mounted to slide axially and to carry the shaft with them in their rotary motion.

My invention is illustrated in the accompanying drawings in which—

Figure 1 is a longitudinal sectional view of my engine showing the rotors in their inner position.

Fig. 2 is a similar view showing the rotors in their outer positions.

Fig. 3 is an enlarged longitudinal sectional view through the rotor hub with the turbine vanes omitted.

Fig. 4 is a section on the line 4—4 of Fig. 3, showing the disk in closed position.

Referring to the drawings in detail, 1 represents the cylinder of the engine which is fixed to a suitable base portion as 2 and may be jacketed, if desired, in any well known manner. A power shaft 3 is positioned within the cylinder 1 coaxial therewith and is supported outside of the cylinder at opposite ends thereof in suitable journal posts 4 mounted on the base portion 2 in fixed relation to the cylinder. The shaft may be provided at either or both ends with suitable transmission devices such as the pulley 30. A pair of turbine rotors 5—6 are slidably mounted on the shaft 3 within the cylinder. Each of these rotors comprises a hub 7 feathered on the shaft by means of ball bearings 8 running axially of the shaft in grooves or channels 9 and 10 in the hub and shaft, respectively, the arrangement allowing the rotor hub to slide longitudinally of the shaft but causing it to carry the shaft with it in its rotary movement. A piston 11 is formed on the center of the hub and is provided with a packing or piston ring 12 mounted in its periphery. The vanes 13 of the rotor are carried on the tapered end of the hub as indicated in dotted lines in Fig. 3, and the body of the piston 11 is provided with radial slots 14 which register with the spaces between the vanes 13 and pass through the body of the piston at substantially the angle of the vanes, the walls of the slots being preferably arranged to form continuations of the surfaces of the vanes. A valve disk 15 is rotatably mounted on the hub and partially countersunk in the outer face of the piston 11. This valve disk is provided with radial slots 16 equal in number to the number of piston slots 14 arranged to be brought into and out of register with the piston slots upon rotation of the valve disk. The valve disk is rotated by means of a pin 17 carried by the disk and which engages with a cam slot 18 in the shaft.

The rotors 5 and 6 are positioned in the engine cylinder 1 with the pistons toward the ends of the cylinder as shown in Figs. 1 and 2 and are normally held equally spaced from the center and in the position shown in Fig. 1 by means of compression springs 19 which bear inwardly against the rotors through washers 20 and outwardly against the shaft in opposite directions through the flanged stop-nuts 21 held in adjusted position by lock nuts 22 engaging the threaded portions 23 of the shaft 3.

The wall of the cylinder 1 near the center together with the rotors 5 and 6 form the limiting walls of the combustion chamber 24 into which the fuel is introduced under pressure through a needle valve 25. The fuel used is preferably in the form of raw oil and compressed air fed in through the pipes 26 and 27. The valve disks 15 with their pins 17 and the cam slots 18 are so arranged in relation to each other that when the rotors are in the normal position shown in Fig. 1, the valve disks will be in position to close the slots 14 in the pistons 11 as shown in Fig. 3, and upon outward movement of the rotors will remain in the closed position for a short distance and will then be rotated to bring their slots 16 into register with the slots in the pistons retaining the latter position to the end of the outward movement of the rotors. This effect of the cam slot 18 on the movement of the valve disk will be understood from inspection of Fig. 3, where it is shown as continuing straight for a short distance from the inner end as at 28, then bends as at 29 into the straight portion extending the remainder of its length.

In operation, the rotors 5 and 6 being in the normal position of Fig. 1, oil is injected by means of compressed air through the needle valve 25 in the form of atomized fuel into the combustion chamber 24 where the fuel is ignited by the high compression, in a manner well understood. If desired, however, the ignition of the initial charge may be effected by any suitable electrical or other ignition system. The gases resulting from the explosion drive the two turbine rotors apart, after a slight outward movement of which the valve disks 15 are rotated to open the passages through the turbine vanes permitting the explosion gases to slowly escape through the turbine rotors rotating both in the same direction, the outward axial motion of the rotors being retarded and finally stopped by the compression springs. The compression springs then drive the rotors back toward the center of the cylinder, forcing out the remaining exhaust gases, the rotors continuing to rotate in the same direction, while the escape of the exhaust gases exerts some further torsional force. The valve disks again close the passages through the rotors shortly before they reach the normal position after which the cycle of operations is repeated, thus keeping the power shaft in constant rotation.

It is to be noted here that there will be some forcible exhaustion of the gases toward the end of the back stroke due to the flywheel effect of the rotors, which effect may be rendered *nil* or increased by proper relative adjustment of the parts.

For the sake of clearness of disclosure, the means for controlling the turning of the valve disks are shown as having a fixed adjustment, but it will be clear to those skilled in the art that the turning of the valve disks may be adjustably timed in various ways.

While I have herein shown and described a specific embodiment of my invention, it is to be understood that the invention is not limited to such particular embodiment and that all such modifications and variants thereof as fairly fall within the scope of the appended claims are contemplated by me.

Having thus described my invention what I claim and desire to secure by Letters Patent is—

1. In an internal combustion engine, a cylinder, a power shaft located within the cylinder coaxial therewith, a pair of turbine rotors feathered on the shaft within the cylinder for rotary and axial movement therein, tension means tending normally to hold the rotors in a given spaced relation to said cylinder, means for admitting fuel into the space between the rotors to be exploded therein, and means operable to open and close the gas passages through the rotors at predetermined positions of the rotor on the shaft.

2. In an internal combustion engine, a cylindrical chamber, a power shaft mounted in bearings and extending into said chamber coaxially therewith, a pair of turbine rotors feathered on the shaft within the chamber, turbine vanes or buckets carried by said rotors, said vanes and rotors being arranged to cause said rotors to rotate in the same direction by the passage of gases therethrough from between the rotors, a compression piston carried by each rotor engaging the walls of said chamber and having passages therein forming continuations of the passages between said vanes, a valve disk for each piston having openings arranged to be brought into and out of register with the passages in the piston to open and close the same upon rotation of the valve disk, means carried by said valve disk and coöperating with a cam groove in the shaft for converting relative axial movement of the rotor and shaft into a relative rotary motion between said piston and said valve disk to open and close said passages at predetermined points in the axial movement of the rotor, compression springs tending to force said rotors toward each other, means for introducing fuel into the chamber between the rotors and igniting the same, and means for adjusting the tension of said springs.

3. In an internal combustion engine, a combustion chamber, a turbine rotor having gas passages therein slidably mounted in said chamber to expand and contract said chamber in moving in opposite directions, and means for opening and closing the gas passages through said rotor at given points in its sliding movement.

4. In an internal combustion engine, a combustion chamber having movable walls operable to expand and contract the same, a turbine rotor having gas passages therein and operatively connected with said combustion chamber, and means for preventing the passage of gas through said rotor at a given point in both the expansion and contraction of said combustion chamber.

5. In an internal combustion engine, a combustion chamber, a turbine rotor forming a portion of the confining walls of said chamber and mounted to slide on its axis of rotation to expand and contract said chamber, means for forcibly sliding said rotor in a direction to contract the combustion chamber, and means for preventing the passage of gases through the vanes of said rotor during a given portion of said chamber contracting movement.

6. In an internal combustion engine, a combustion chamber arranged to be expanded by pressure produced therein by the combustion of fuel, means for introducing fuel into said combustion chamber, means for forcibly contracting said combustion chamber, a turbine rotor, means for directing the flow of gases from said chamber through the vanes or buckets of the rotor, and means for checking the passage of gases through said rotor at a predetermined point before the limit of contraction of said chamber is reached so as to produce compression therein.

7. In an internal combustion engine, a combustion chamber, a turbine rotor having gas passages therein in operative communication therewith, means for closing the passages through said rotor, and means for operating said rotor as a piston to effect compression in said combustion chamber.

8. In an internal combustion engine, a cylinder, a power shaft located in the cylinder coaxial therewith, a turbine rotor having driving vanes and feathered on the shaft for rotary and axial movement therein, means for supplying an operating fluid under pressure to said rotor, valves controlling the passage of fluid through said vanes, tension means tending normally to move said rotor against the force of said fluid, and means operable to open and close said valves at predetermined positions of the rotor on said shaft.

9. In an internal combustion engine, a shaft, a cylinder coaxial therewith, and a turbine element in the form of a piston having both reciprocating and rotary motion in the cylinder, and connections to the shaft to turn the latter in said motion, unidirectionally.

10. In an internal combustion engine, a cylinder, a pair of turbine elements in the form of oppositely acting sliding pistons therein, and a shaft connected to said pistons so as to be unidirectionally rotated in their opposite motions.

11. In an internal combustion engine, an open ended cylinder with turbine elements in the form of oppositely acting sliding pistons inclosing a combustion space or chamber between them, a shaft common to said pistons, and connections therebetween.

12. In an internal combustion engine, an open ended cylinder, and two oppositely acting pistons having play to and from each other to form an expansible combustion space or chamber between them, vanes in said pistons to turn them when pressure is created in said chamber, and a shaft connected to be actuated by both pistons.

13. In an internal combustion engine, a cylinder with a pair of sliding pistons therein inclosing a combustion space or chamber between them, turbine vanes in said pistons arranged to turn them both in the same direction by pressure due to the explosion of gas in the combustion chamber, and a shaft common to said pistons connected to be turned unidirectionally by either or both of them in their motion.

14. In an internal combustion engine, a cylinder or casing, a pair of turbine elements in said cylinder or casing, each provided with vanes and the pair inclosing a combustion chamber between them, means to produce compression in said combustion chamber, and valves carried by said turbine elements and controlled in the motion of the said elements to permit the escape of the products of combustion.

15. In an internal combustion engine, a cylinder or casing, a pair of turbine elements in said cylinder or casing, each provided with vanes and the pair inclosing a combustion chamber between them, means to produce compression in said combustion chamber, and valves carried by said turbine elements and controlled in the motion of the said elements to permit the escape of the products of combustion, together with a shaft unidirectionally rotated by either or both of the elements.

In testimony whereof I affix my signature.

AUGUST SCHEIBLER.